United States Patent
Wolff

(10) Patent No.: US 6,609,435 B1
(45) Date of Patent: Aug. 26, 2003

(54) ACTUATING ELEMENT A STRAIGHT-TOOTHED GEARBOX

(75) Inventor: Valentin Wolff, Wingen (FR)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/914,085
(22) PCT Filed: Feb. 9, 2000
(86) PCT No.: PCT/EP00/01018
§ 371 (c)(1), (2), (4) Date: Aug. 22, 2001
(87) PCT Pub. No.: WO00/52361
PCT Pub. Date: Sep. 8, 2000

(30) Foreign Application Priority Data

Feb. 27, 1999 (DE) .......................... 199 08 570

(51) Int. Cl.7 ............................. B60K 20/12
(52) U.S. Cl. .............. 74/473.36; 403/230; 403/324; 411/339
(58) Field of Search .................. 74/473.36, 473.37, 74/335, 473.1; 403/12, 154, 179, 230, 242, 272, 271, 260, 315, 324, 408.1; 411/339, 504, 538

(56) References Cited

U.S. PATENT DOCUMENTS

| 1,378,222 A | * | 5/1921 | Frins ..................... 74/473.36 |
| 3,257,861 A | * | 6/1966 | Siefferman ............. 74/473.36 |
| 3,481,634 A | * | 12/1969 | Rondeau ................. 403/230 |
| 3,905,173 A | * | 9/1975 | Gerken .................. 403/242 |
| 4,320,670 A | | 3/1982 | Kawamoto |
| 4,524,856 A | * | 6/1985 | Renaud .................. 74/473.36 |
| 4,600,332 A | * | 7/1986 | Sharp et al. ............. 403/271 |
| 4,974,989 A | * | 12/1990 | Salter ..................... 411/339 |
| 5,040,917 A | * | 8/1991 | Camuffo ................. 411/339 X |
| 5,054,980 A | * | 10/1991 | Bidefeld ................. 403/271 X |
| 5,893,293 A | * | 4/1999 | Earp ....................... 74/335 |
| 6,010,274 A | * | 1/2000 | Abouzahr .............. 403/260 X |

FOREIGN PATENT DOCUMENTS

| DE | 89 02 040 U1 | 7/1989 |
| DE | 44 32 382 A | 3/1996 |
| EP | 0 332 442 A | 9/1989 |
| FR | 24 39 339 A | 5/1980 |
| JP | 10220577 A | 8/1998 |

* cited by examiner

Primary Examiner—Thomas R. Hannon
Assistant Examiner—Colby Hansen
(74) Attorney, Agent, or Firm—Henry M. Feiereisen

(57) ABSTRACT

An actuating element for shifting a variable-speed gearbox intended for use in vehicles and including a rotatable shift shaft, which is shiftable in an axial direction and made of steel, for play-free attachment of at least one metallic driver in a manner precluding rotation by means of a pin connection. The pin connection includes a grooved stud having a shank portion, which is fitted in a receiving bore of the shift shaft, and a head, which is supported by the shift shaft. The shank portion of the grooved stud has a shank end, which is inserted in a bore of the driver and disposed flush with an outer contour of the driver, wherein the grooved stud is secured to the driver by a weld.

15 Claims, 2 Drawing Sheets

ACTUATING ELEMENT A STRAIGHT-TOOTHED GEARBOX

FIELD OF THE INVENTION

The actuating element is a component of an internal gear shifting arrangement, with which a change of gears can be carried out, which is initiated by moving the shift stick which is preferably manually actuated. The invention relates to an actuating element which is comprised of a plurality of metallic components, such as, a shift shaft or a shift rod at which is disposed, so as to be non-rotating, at least one driver.

BACKGROUND OF THE INVENTION

The arrangement of known actuating elements provides that the driver, for example, made of sheet metal, is connected in non-releasable manner by a welded connection to the shift shaft or, respectively, the shift rod. The heat generated during welding considerably heats the shaft, with the danger of a non-permissible deformation readily arising. At the same time, the welded connection is not suitable for a shaft that is hardened or, respectively, for a shaft that is provided with a corrosion protection. Furthermore, in the materials selection for the shift shaft attention needs to be paid to its suitability to be welded.

So as to avoid this welded connection, the driver can be connected, in an alternate embodiment, to the shift shaft or, respectively, the shift rod, by way of riveting. For this, holes are drilled into the shaft and its driver and the rivet is set or deformed by a punching step at the end, opposite with respect to the rivet head. Such a connection is illustrated in French Patent Application 24 39 339 A in FIG. 4 thereof. This connection does not achieve a permanently pre-stressed securement of the driver at the shift shaft or, respectively, the shift rod. In the presence of large transfer forces or, respectively, transfer moments, there arises the danger that the rivet connection loosens and, consequently, a precise shifting is not assured or, respectively, is subject to being compromised.

OBJECT OF THE INVENTION

In consideration of the detriments of the known connections, it is an object of the present invention to provide a securement for the components which ensures a lasting connection, independently of the material of construction of the shift shaft or, respectively, the shift rod, and concomitantly provides for maintaining the shape.

SUMMARY OF THE INVENTION

The aforementioned object is solved thereby that the components comprising a shift shaft or a shift rod in combination with the driver are joined without play by a pin connection, whereby a shank end of the pin connection is secured in non-releasable manner on the side of the driver by means of a weld. By way of the contemplated welding, the shank end of the pin connection is initially heated—which leads to a longitudinal expansion. Upon cooling, the pin connection contracts in length, whereby the resultant length of the shank end, due to the shank end being connected to the driver in material-cohesive manner, effects a pre-stressing. This pre-stressing also effects a pre-stressed contact of the driver at the shift shaft or, respectively, the shift rod, which is without play, and this leads to a reliable and lasting securement which is also of the nature to withstand the shifting conditions to which it is subjected.

The system of securement in this does not lead to a detrimental deformation of the shift shaft or of the shift rod. Accordingly, with the pin connection according to the invention, finished components can be assembled into a unit while maintaining the required manufacturing quality for the complete actuating element. In preferred manner, the connection that is subjected to stress can be manufactured by means of a welding apparatus or, respectively, through automated apparatus in a cost-efficient manner and, accordingly, acquires a cost advantage. Furthermore, the connection type of the invention, in contrast to hitherto known solutions, is neutral with respect to space requirements and, accordingly, is replaceable.

A grooved stud is useful as pin connection, which grooved stud is positioned in the receiving bore, and the head of which is supported at the shift shaft or at the shift rod. The length of the grooved stud is selected in such a manner that this is in congruity with the outer contour of the driver, or it projects slightly from the driver. As a useful measure for the achievement of a press fit of the grooved stud in the receiving bore, this is slightly narrower than the diameter of the grooved stud. This press fit achieves a desired implantation of the grooved stud without play in the shift shaft or, respectively, the shift rod, and assures that the stud is not lost during assembly.

Between the bore in the driver, for implantation of the grooved stud, and the diameter of the grooved stud, preferably, there is provided a transition fit such that during assembly of the grooved stud that is already inserted in the shift shaft or, respectively, the shift rod, upon a joining to the driver, the grooved stud does not shift prior to welding. Alternatively, the invention also encompasses a slack fit between the grooved stud and the bore in the driver. A resulting installation play can be utilized to position the components of the actuating element in a welding apparatus.

For the purpose of optimization of the weld connection in the case of a transition fit, the connection embraces a chamfer, a countersink or, respectively, a recess in the bore of the driver. The countersink is in this provided at the side which faces away from the shift shaft. This free space allows an optimized welded connection, without detrimentally affecting the outer contour of the driver. In the case of a slack fit between the grooved stud and the bore in the driver, such a countersink may be done without, in the case that the installation play is sufficiently large, for example.

The effectiveness of the pin connection in accordance with the invention can be further enhanced if the components of the actuating element in accordance with the invention are connected by a plurality pin connections which are respectively offset with respect to one another in angular spacing. A welding method suitable for the connection in accordance with the invention is preferably a protection-gas welding method, such as, for example, a MAG (metal-active-gas) method.

BRIEF DESCRIPTION OF THE DRAWINGS

Further description of the invention is in reference to the drawings which illustrate an embodiment, in which.

DETAILED DESCRIPTION OF THE DRAWINGS

Figure 1:
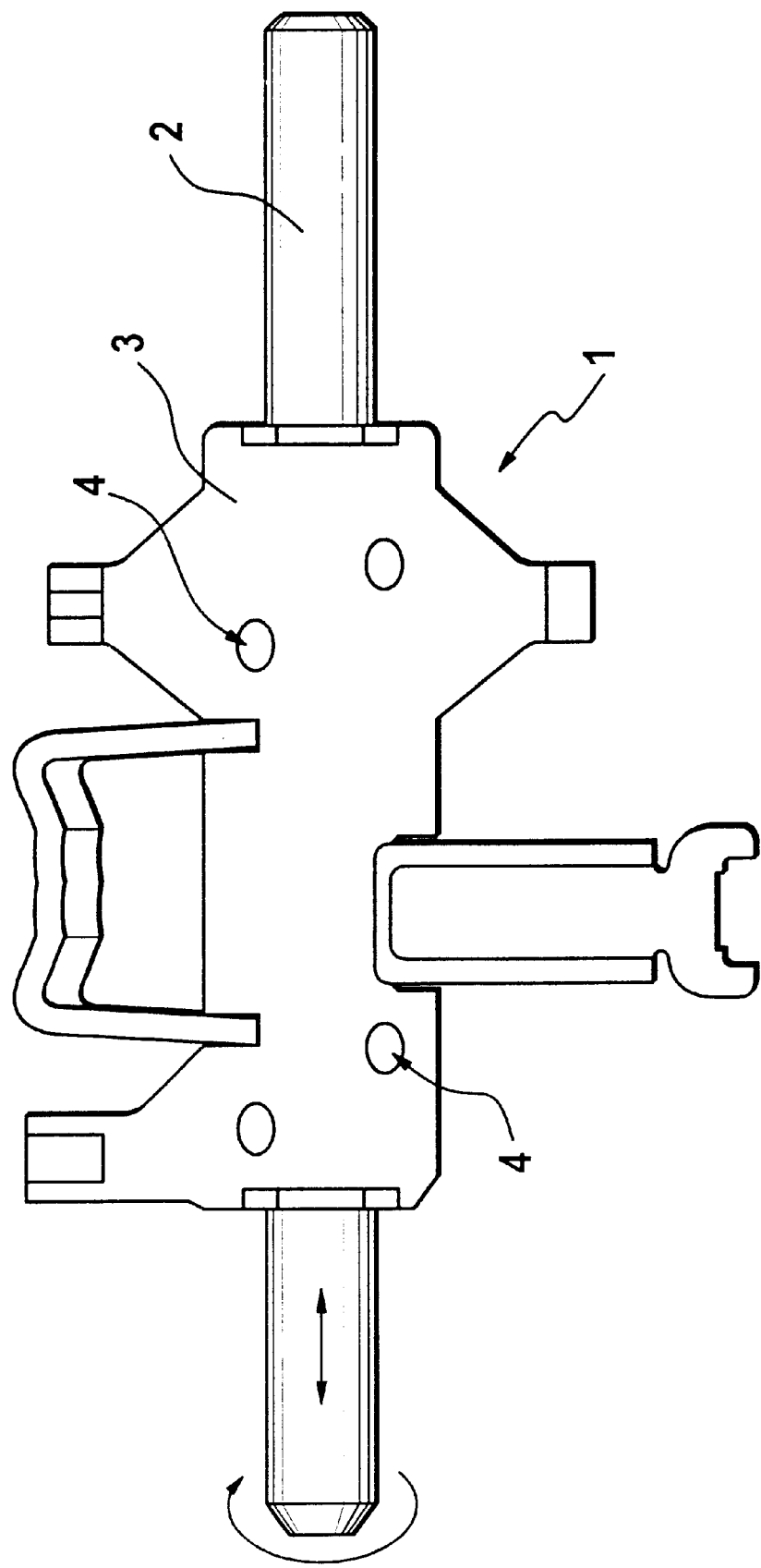
FIG. 1 is a side elevation of the actuating element in accordance with the invention, comprising a shift shaft and a driver.

With reference to FIG. 1, the shift element 1 is illustrated, comprising a shift shaft 2 which can be moved in axial direction and which can be turned; as well as a driver 3. The driver 3 comprises a part that is produced without production of chips and is produced, for example, by stamping or deep-drawing, and the driver is connected to the shift shaft 2 by means of pins, with the connection being such that it is located away from the ends of shift shaft 2 at both ends thereof. Provision is made for altogether four pin connections 4 which are respectively disposed with respect to one another in angular offset spacing.

Figure 2:
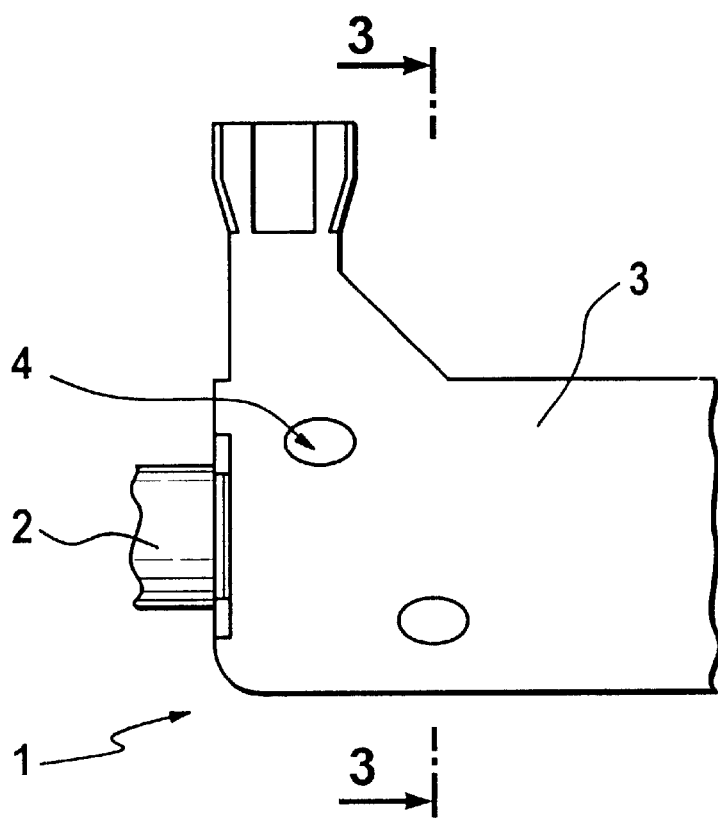
FIG. 2 shows a portion from the driver according to FIG. 1, drawn to a larger scale.
Figure 3:
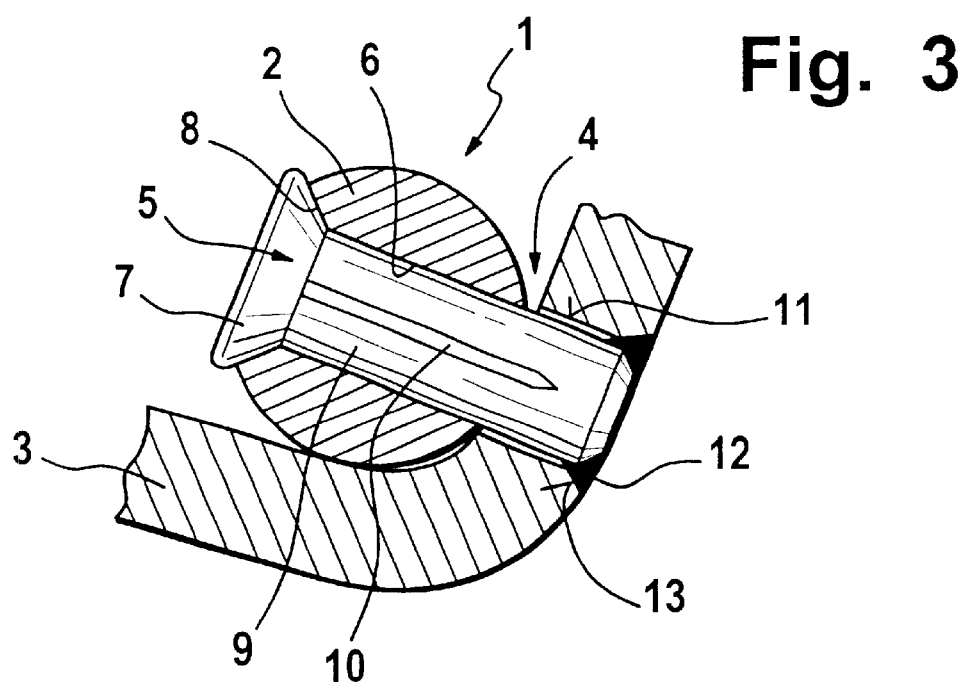
FIG. 3 is a cross-section along line 3—3 in FIG. 2.

FIGS. 2 and 3 illustrate details of the shift element 1 drawn to a larger scale and indicate the securement of the driver 3 at the shift shaft 2. The pin connection 4 is shown in cross-section in FIG. 3. In accordance with this, a grooved stud 5 is positioned in a receiving bore 6 of the driver 3 and the conical head 7 thereof is pressed into a correspondingly conical countersink 8 of the receiving bore 6. Distributed about the circumference of the mantle surface of the shank 9, the grooved stud 5 comprises longitudinal grooves 10 which respectively form raised portion directed in radial direction and, accordingly, project from the mantle surface of the shank 9 in radial direction. Between the diameter of the grooved stud 5 and the receiving bore 6, there is provided an overlap such that the grooved stud 5 is pressed into the shift shaft 2 without play being present. A bore 11 is arranged in the driver 3 in such a way that the shift shaft 2 is supported, in the installed attitude, as much as possible at two support points which are offset by almost 90 degrees.

The driver 3 comprises a bore 11 into which the shank end of the grooved stud is inserted. Between the diameter of the bore 11 and the grooved stud 5 there is provided a play that is in conformity with installation and which allows a precise positioning, that is, a two point support of the shift shaft 2 at the driver 3. So as to achieve a non-releasable, material-cohesive securement of the grooved stud 5 at the driver 3, these components as connected by way of welding in material-cohesive manner. The installation play between the grooved stud 5 and the bore 11 in the driver 3 permits an alignment or, respectively, a positioning of the shift shaft 2 in reference to the driver 3 prior to welding. So as to achieve a sufficiently dimensioned weld seam 12, the end of the bore 11 is provided with a conical countersink 13. Welding ensures a lasting pre-stressed securement of the grooved pin 5, since upon cooling of the weld that longitudinal dimension of the grooved stud 5 is reduced. For welding there is suitable a protection gas welding method, preferably, a metal-active-gas (MAG) welding method. Due to the countersink 13 in the driver 3, the weld seam 12 does not project beyond the outer contour of the driver 3.

What is claimed is:

1. An actuating element for shifting a variable-speed gearbox for use in vehicles and including a rotatable shift shaft, which is shiftable in an axial direction and made of steel, for play-free attachment of at least one metallic driver in a manner precluding rotation by means of a pin connection which includes a grooved stud having a shank portion, which is fitted in a receiving bore of the shift shaft, and a head, which is supported by the shift shaft, wherein the shank portion of the grooved stud has a shank end, which is inserted in a bore of the driver and disposed flush with an outer contour of the driver, wherein the grooved stud is secured to the driver by a weld.

2. The actuating element of claim 1, wherein the grooved stud is press-fitted into the receiving bore of the shift shaft with an overlap or an excess dimension.

3. The actuating element of claim 1, wherein a transition fit is provided between the bore in the driver and the grooved stud.

4. The actuating element of claim 1, wherein the bore of the driver for receiving the shank end of the grooved stud has a diameter which is greater than a diameter of the shank portion of the grooved stud.

5. The actuating element of claim 1, wherein the bore in the driver has a countersink on a side which faces away from the shift shaft.

6. The actuating element of claim 1, wherein a plurality of said pin connection are provided for securing the driver to the shift shaft, wherein the pin connections are disposed in angular offset relationship.

7. The actuating element of claim 1, wherein the grooved stud is welded to the driver through a protection-gas welding method.

8. In combination:

a rotatable shift shaft of a variable-speed gearbox, said shift shaft configured for displacement in an axial direction;

an actuating element having a driver; and connection means for play-free securement of the driver in fixed rotative engagement with the shift shaft, said connection means including a grooved stud having a head, which is supported by the shift shaft, and a shank portion, which extends from the head and is fitted in a receiving bore of the shift shaft, wherein the shank portion of the grooved stud has a head-distal shank end, which is inserted in a bore of the driver secured flush with an outer contour of the driver by a weld.

9. The combination of claim 8, wherein the shift shaft is made of steel.

10. The combination of claim 8, wherein the driver is made of metal.

11. The combination of claim 8, wherein the grooved stud is press-fitted into the receiving bore of the shift shaft.

12. The combination of claim 8, wherein a transition fit is provided between the bore in the driver and the grooved stud.

13. The combination of claim 8, wherein the bore has a diameter which is greater than a diameter of the shank end of the grooved stud.

14. The combination of claim 8, wherein the bore has a countersink on a side which faces away from the shift shaft.

15. The combination of claim 8, wherein the connection means includes a plurality of grooved studs for securing the driver to the shift shaft, wherein the grooved studs are disposed in angular offset relationship.

\* \* \* \* \*

UNITED STATES PATENT AND TRADEMARK OFFICE
CERTIFICATE OF CORRECTION

PATENT NO.    : 6,609,435 B1
DATED         : August 26, 2003
INVENTOR(S)   : Valentin Wolff It is certified that error appears in the above-identified patent and that said Letters Patent is hereby corrected as shown below:

<u>Title page, Item [54] and Column 1, lines 1 and 2,</u>
Replace current title with -- ACTUATING ELEMENT FOR A VARIABLE SPEED GEARBOX --.

Signed and Sealed this

Sixteenth Day of March, 2004

JON W. DUDAS
*Acting Director of the United States Patent and Trademark Office*